United States Patent [19]
Calcote et al.

[11] Patent Number: 5,765,964
[45] Date of Patent: Jun. 16, 1998

[54] SUBMERGED COMBUSTION PROCESS AND APPARATUS FOR REMOVING VOLATILE CONTAMINANTS FROM GROUNDWATER OR SUBSURFACE SOIL

[75] Inventors: Hartwell F. Calcote, Princeton; Charles H. Berman, East Windsor, both of N.J.

[73] Assignee: Aerochem Research Laboratories, Inc., Princeton, N.J.

[21] Appl. No.: 681,006

[22] Filed: Jul. 22, 1996

[51] Int. Cl.$^6$ ............................................ B09C 1/06
[52] U.S. Cl. ................... 405/128; 166/272.1; 166/303; 166/370; 210/170; 210/747; 405/131
[58] Field of Search ............................ 405/128, 131; 210/170, 747, 908, 909; 166/57, 59, 245, 272.1, 272.3, 303, 370

[56] References Cited

U.S. PATENT DOCUMENTS

| | | | |
|---|---|---|---|
| 4,913,065 | 4/1990 | Hemsath | 405/128 X |
| 5,011,329 | 4/1991 | Nelson | 405/131 X |
| 5,193,934 | 3/1993 | Johnson et al. | 405/128 |
| 5,360,067 | 11/1994 | Meo, III | 210/908 X |
| 5,482,402 | 1/1996 | Nelson | 405/128 |

*Primary Examiner*—George A. Suchfield
*Attorney, Agent, or Firm*—Louis E. Marn

[57] ABSTRACT

Combustion is used as a source of heat to remove polluting volatiles from contaminated groundwater and subsurface soil. The combustor is placed in a well, either in or out of an aquifer, to produce steam and combustion product gases and/or hot water which drives off the volatile contaminants which are collected through separate wells or vents depending upon the site. Key elements are the addition of heat in-situ by causing the combustion to occur below the ground or water level, transfer of heat through the aquifer and/or ground through the flow of steam and combustion product gases and/or hot air and/or hot water to regions affected by the contaminants, and by drawing the flow to other well sites by which the contaminants are removed by pumping and subsequent treatment. Some of the contaminants are thermally destroyed. The design of the well casing can be tailored to proportion the quantities of water and steam and gas delivered, with steam and gas pressure driving the vapors at various levels below ground. The collected vapors from the pumped wells or vents are removed by a variety of techniques.

17 Claims, 4 Drawing Sheets

SUBMERGED COMBUSTION PROCESS AND APPARATUS FOR REMOVING VOLATILE CONTAMINANTS FROM GROUNDWATER OR SUBSURFACE SOIL

BACKGROUND OF THE INVENTION

1. Field of the Invention

This invention relates to contaminant removal, and more particularly to a process and apparatus for removing volatile contaminants from groundwater or subsurface soil.

2. Description of Related Art

Clean up of contaminated ground water is a major economic burden on many companies or communities and is a particular burden on owners of real estate, who because of the contaminant, regardless of how small, are hindered in marketing their property or even in using it as collateral. Groundwater is frequently contaminated by nonaqueous liquids such as organic solvents, including chlorinated hydrocarbons, e.g., trichloroethylene; 1,1,1-trichloroethane; trichlorofluoromethane; 1,2-dichloroethylene; perchloroethylene; trichloromethane; 1,1-dichloromethane and 1,1-Dichloroethylene and petroleum products, including xylenes; toluene; benzene and gasoline.

Present practices for groundwater clean-up are inefficient and expensive. After many years of operating a clean-up system, the water purity may still fall far below government regulation requirements since many of such contaminant substances form separate phases and are trapped in small crevices in the ground and within soil pores and are thus not easily displaced by water flow through the ground.

There is a major problem in removing volatiles, e.g., trichloroethylene, TCE, from groundwater by the classical technique. Such technique involves pumping water from one or more wells, either aerating the water above ground, transferring the volatiles to the atmosphere, or absorbing the volatiles on a substrate, e.g., charcoal. The charcoal must then be disposed of whereas the treated water is returned to the ground either by pumping it into one or more wells or causing it to flow on the ground surface and seep into the ground. Certain contaminants are heavier than water and are closely bound in the soil and are not readily displaced by such technique. In some instances, the use of a surfactant to alter the adhesion of the contaminant to the soil has been successfully employed. It is, however, essentially impossible to remove volatile contaminants by this technique to the extent required to meet federal and/or state standards. In addition, the process is very slow, requiring many years to make any progress at all in cleaning the environment.

Several improved techniques have recently been suggested to solve such problem. In one instance, an electric current is passed through the ground and the electrical resistance of the ground creates a voltage drop and thus heats the ground driving off the volatile. This is a very expensive and potentially dangerous process. In another system, a steam generator is constructed on the site and steam is injected into a well to heat the ground surrounding the well and drive off the volatiles to be collected and treated. This technology is similar to that used in oil recovery from oil wells. Thermal energy is lost through conduction if the steam is transported over any distance to the well or if it is injected deep into a well.

In another technique, a large vacuum pump is used to create a low pressure at the end of the well casing and thus aiding in the vaporization of volatile contaminants. Such volatile contaminants are pumped by the exhaust of the vacuum pump through a trap to trap out volatile contaminants and some water. A major problem with such system is the pump size required, especially if the soil is porous; air might then be pumped from the ground surface through the ground creating an unnecessary load on the pump making it more difficult to volatilize the contaminants. Again an expensive process. The process does not result in long term remediation when contaminants are closely bound to the soil.

In another modification of these systems, the volatile contaminants are subjected by UV light or similar radiative source to destroy same rather than being collected by charcoal.

U.S. Pat. No. 3,371,713 demonstrates the usefulness of submerged combustion for oil recovery. U.S. Pat. Nos. 4,982,788 and 5,011,329 disclose gas heating for removal of volatile contaminants using above-ground heaters. U.S. Pat. No. 5,018,576 demonstrates the use of steam injection for decontamination of a subsurface area.

OBJECTS OF THE PRESENT INVENTION

An object of the present invention is to provide a more cost effective and faster process and apparatus for removing contaminants from groundwater or subsurface soil.

Another object of the present invention is to provide a more cost-effective and faster process and apparatus for removing contaminants from groundwater or subsurface soil which may be facilely positioned at any desired location.

Still another object of the present invention is to provide a more cost-effective and faster process and apparatus for removing contaminants from groundwater or subsurface soil eliminating esoteric process and apparatus requirements.

SUMMARY OF THE INVENTION

These and other objects of the present invention are achieved by positioning a suitable underground burner assembly in a wet or dry well below ground level to remove volatile contaminants from the well, from the aquifer surrounding the well, or from the subsurface soil in the vicinity of the well. In some applications, a predetermined surface area about the well is overlaid with a vapor barrier wherein the vapor barrier is provided with an outlet conduit in fluid communication with a pump or blower and wherein the discharge side of the pump or blower is in fluid communication with an assembly for selective removal of the contaminants and wherein the underground combustion is affected at a rate to vaporize the volatiles for collection and removal, the rates of desorption from soil particles and vaporization increasing rapidly with increasing temperature. Should the well being treated include an impermeable or partially impermeable strata, the vapor barrier is not required and volatile contaminants are removed via a downstream well to which the volatile contaminants are carried by natural or pumped water flow. If regulations permit direct discharge of the contaminants into the atmosphere, then a vapor barrier is also not required. In some other applications, one or more vapor extraction wells near the heated well are provided with an outlet conduit via a pump or blower through a treatment process and the water is discharged into the burner well or by other means used to recharge the aquifer.

BRIEF DESCRIPTION OF THE DRAWINGS

Further objects and advantages of this invention will become apparent upon the following detailed description thereof with reference to the accompanying drawings wherein like numerals indicate like parts throughout wherein.

DETAILED DESCRIPTION OF THE PREFERRED EMBODIMENT

Figure 1:
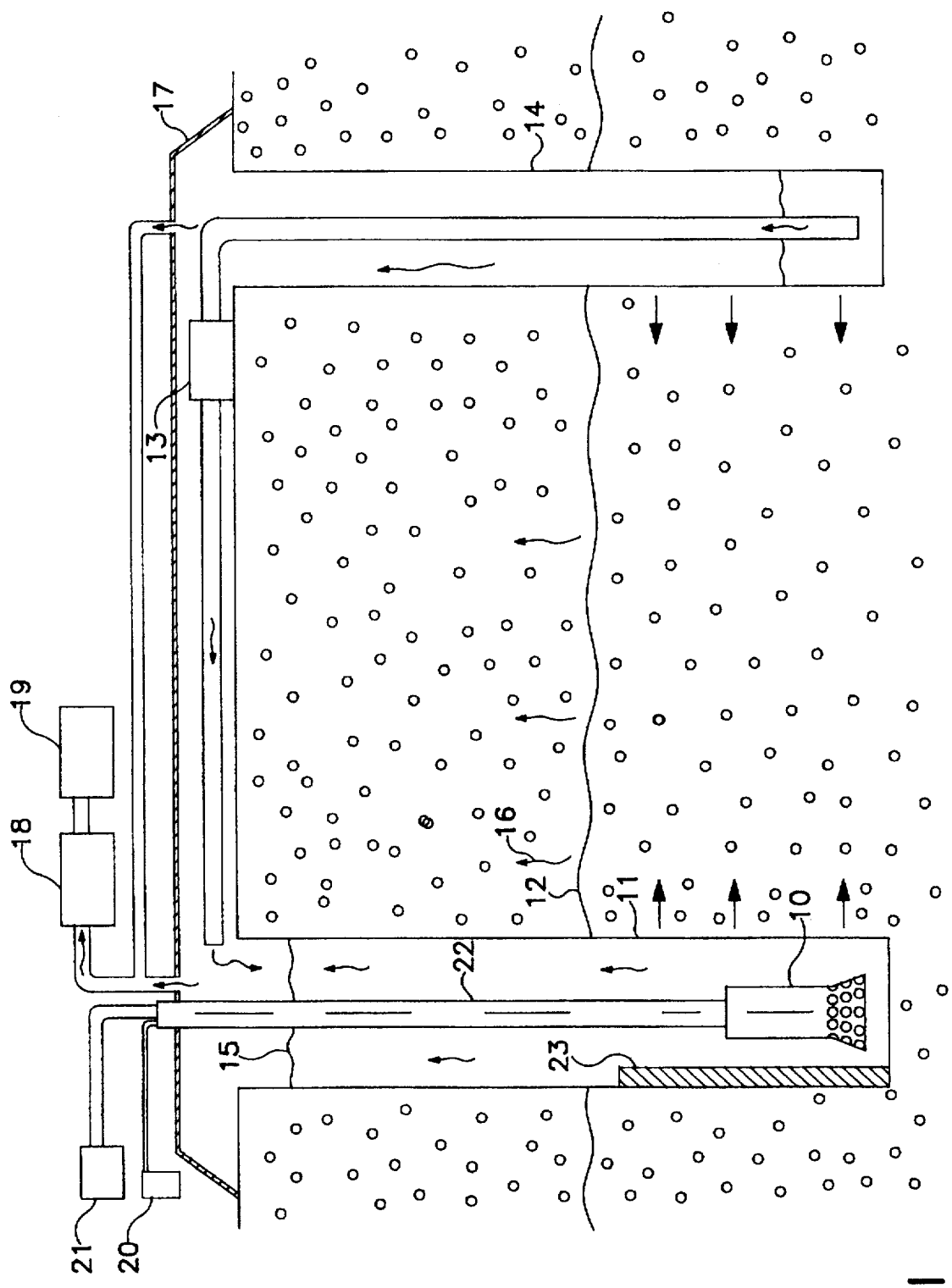
FIG. 1 is a schematic cross-sectional view of one embodiment of an underground combustor, a submerged combustor operating in conjunction with pumped water and a vapor extraction well.

Referring to the drawings and particularly FIG. 1, there is illustrated a submerged combustor 10 immersed in the water in a well 11 beneath water table 12. A pump 13 at a second well 14 may induce a water flow to a water column 15 in well 11. Alternatively, a submersible pump (not shown) may be placed in the well 14 if the water level in well 14 is more than about 30 feet below ground level. Natural water flow may be utilized by itself or with that produced by the pumped well 14 to carry heat from the submerged combustor 10 to the collection well 14. Combustion gases and contaminant vapors 16 released by heating the aquifer and soil rise and are collected in wells 11 and 14 and under a peripherally-disposed vapor barrier 17 from which they are drawn by a fan or vacuum pump 18 to a vapor condenser or charcoal filter 19.

The vapor barrier 17 may not be required under all circumstances. When needed, it should have dimensions that are large enough to cover the ground surface area immediately over the region to be remediated and may consist of a simple sheet of polyethylene or the like. The combustor 10 is supplied with fuel, either by a natural gas line or a natural gas, propane or other fuel tank 20, and with air from a blower or compressor 21 passed through pipe assembly 22 allowing for any degree of premixing or no premixing prior to delivery to the burner 10. A nonsymmetric well casing 23 is positioned to direct the heated water and gas flow in a manner to vaporize the contaminants.

With heat transfer occurring through both convection and conduction, the length of the thermal plume downstream of a well varies as the square of the well dimension normal to the water flow direction. Thus, the volume of the aquifer treated increases rapidly with well diameter. A horizontal well running normal to the flow will greatly increase the volume of aquifer treated.

Figure 2:
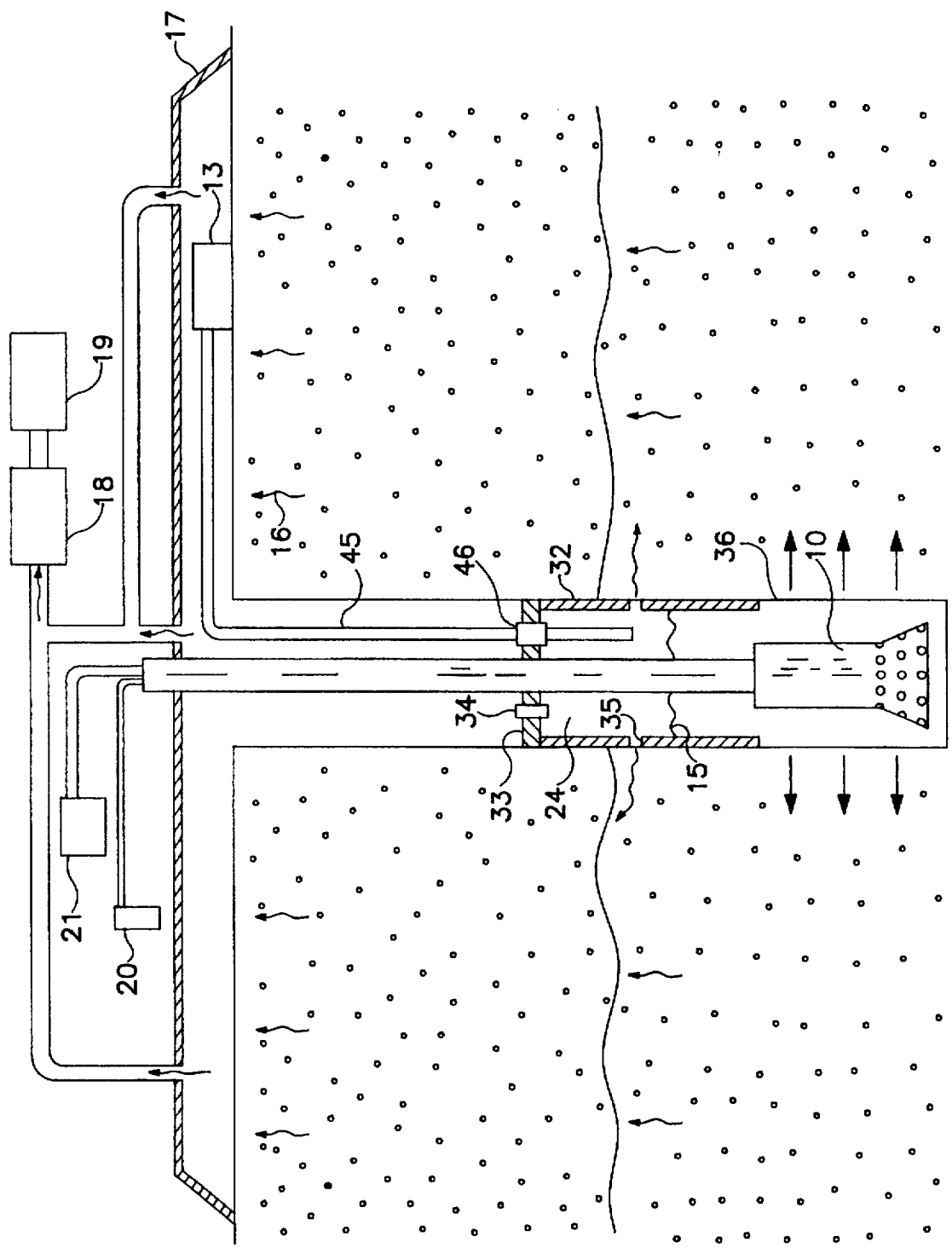
FIG. 2 is a schematic cross-sectional view of another embodiment of a submerged combustor operating under pressure to produce a flow of heated water and combustion gases.

Referring now to FIG. 2, illustrating another embodiment of the present invention wherein the pressure head of the combustion gases is used to increase the flow of heated water in the aquifer and to force heated combustion gases out of the well and through both the aquifer and contaminated soil above it. The submerged combustor 10 is pressurized by the combustion gases and steam in a chamber 24 formed by a casing 32 and a packer 33 to a maximum pressure set by a pressure relief valve 34 wherein the well water is at 15. The pressure is also influenced by gases escaping through openings 35 in the casing and the open bottom portion of the well 36. The openings 35 help to proportion the amount of combustion gases released versus the amount of water flow out of the well. The water flow carrying the heat is determined by the water and gas flow rates out of the heated well in addition to the natural water flow. Combustion gases and contaminant vapors 16 released by the heating of the aquifer and soil rise and are collected under a vapor barrier 17 from which they are drawn by a fan or vacuum pump 18 to a charcoal filter or other above-ground treatment 19 to remove the volatile contaminants.

The combustor 10 is supplied with fuel, either by a natural gas line or a natural gas, propane or other fuel tank 20, and with air from a blower or compressor 21 which are fed through pipe assembly 22 allowing for any degree of premixing or no premixing prior to delivery to the burner 10. Additional water may be supplied from an independent source, such as another well, a lake, or a river, pressurized by a pump 13 and caused to flow through a pipe 45 that passes through a port 46 in the packer 33. Water level controls are used to maintain water around the submerged burner 10. The burner may also be operated without pump 13 and pipe 45 with the port 46 replaced with packing and no water left in the well. Additional gas flow may be made available by adding excess air via blower 21 such that the flame heats this air directly by mixing in the post-combustion zone of the flame or adding some other suitable gas. The system acts as a hot gas sparger with vapor extraction through either the vapor barrier or vapor extraction wells. Under conditions when it is permissible to release the volatile organics to the atmosphere, the barrier 17 and the fan or vacuum pump 18 and the above-ground treatment 19 can be eliminated from the system.

Figure 3:
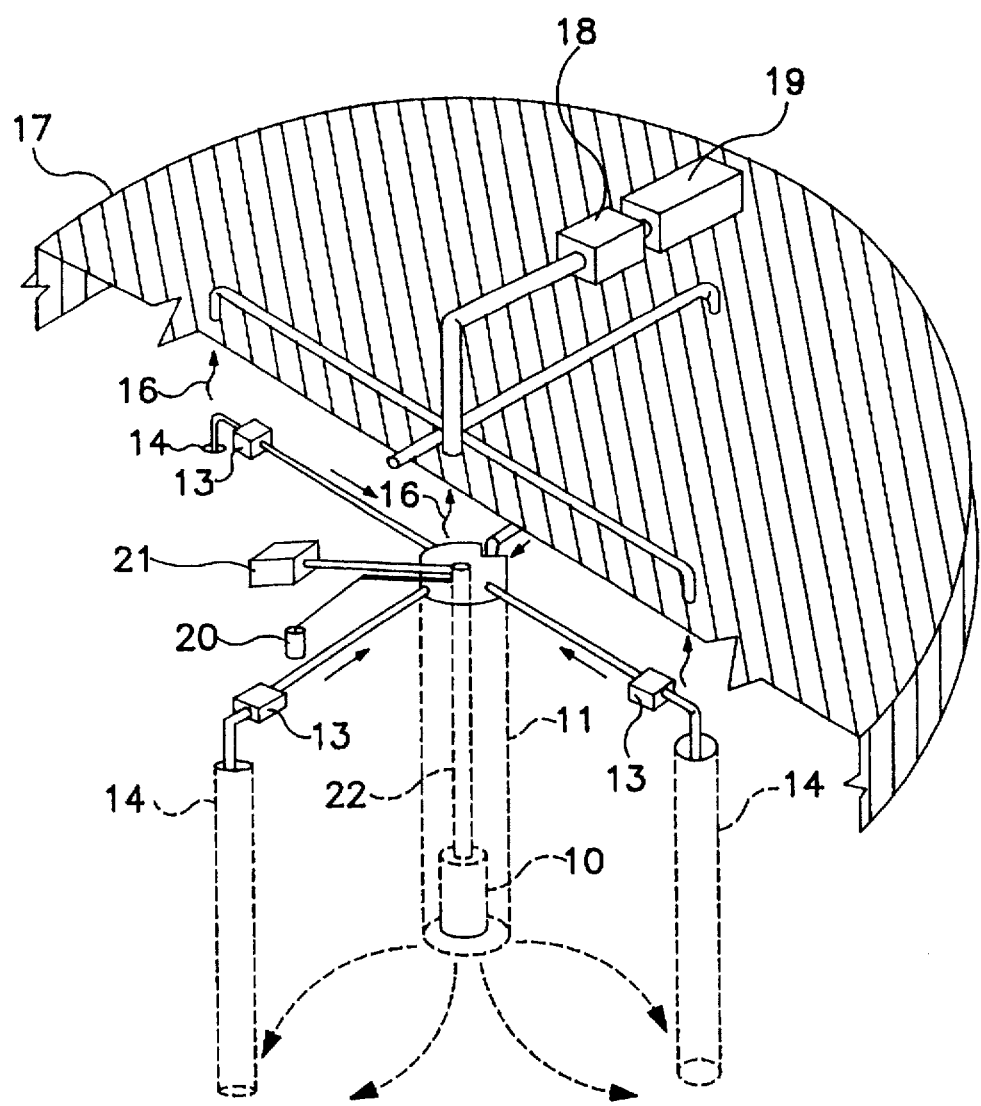
FIG. 3 is a perspective sectional view of another embodiment of a submerged combustor operating in the center of a circular array of collection walls.

Referring now to FIG. 3, a single submerged combustor 10 is placed in a well 11 at the center of an array of wells 14. In this embodiment, the water pumps 13 deliver water back to the central burner well 11, increasing its pressure head. The groundwater flow established carries heat out from the burner well to the surrounding area. Combustion gases and contaminant vapors 16 released by the heating of the aquifer and soil rise and are collected under a vapor barrier 17 from which they are drawn by a fan or vacuum pump 18 to a vapor condenser or charcoal filter 19. Alternatively, the output of wells 14 could be sent separately to a vapor condenser or a charcoal filter.

The combustor is supplied with fuel, either by a natural gas line or a natural gas, propane or other fuel tank 20, and with air from a blower or compressor 21 which are fed through pipe assembly 22 allowing for any degree of premixing or no premixing prior to delivery to the burner 10. As in the second embodiment, use of a packer 33 and pressure relief valve 34 can be added to create a pressure head so that the process can proceed even if the burner well 11 is dry.

In this case, both combustion gases and additional compressed air heated by the combustion transport heat to the subsurface soil and/or the aquifer. The system acts as a hot gas sparger with vapor extraction when vacuum pumps are connected to wells 14. For heat transport through the subsurface soil, temperatures in excess of 100° C. can be maintained, greatly increasing the volatilization rate of contaminants. By placing a burner with an open flame above the water level in wells 14, contaminant vapors can be oxidized in-situ by combustion. The combustion products of chlorinated hydrocarbons would be $CO_2$ and HCl which would go back into the aquifer, probably without any significant increase in pH. Additionally, the well arrangement can be reversed with the central well 11 used for pumping and burners placed in the surrounding wells 14 so that the water and heat flow patterns are directed inward towards the central well.

Generally, the aquifer temperature range is 30° to 95° C., but the preferred range is 50° to 80° C. The total natural gas flow rate to the burner(s), which determines the BTU's supplied to the aquifer, is about 0.1 to 10,000 cubic feet per hour, preferably 3 to 3,000 cubic feet per hour thereby to produce an ever expanding thermal boundary forcing the volatile contaminants out of the ground and under the barrier from which the contaminants are collected and separated. Water pumping rates in the pumped well are from about 0.5 to 30,000 gallons per minute, preferably about 3 to 300 gallons per minute. The number of submerged burners, or submerged burner wells, are from 1 to 100, preferably about 1 to 10. The number of pumped wells is 1 to 50. The distance between the burner well(s) and the pumped well(s) is from 20 to 2,000 feet, but the preferred distance is 50 to 1,000 feet.

To compute heating requirements, consider that a single well heated by submerged combustion has a uniform water flow that passes through and around it. The water velocity is due to either naturally occurring hydraulic gradients or the effect of surrounding pumped or pressurized wells. The boiling point of water limits the maximum water temperature to 100° C. at atmospheric pressure. To remediate a portion of an aquifer every point in that region must be heated to the proper temperature for a time $t_r$. The volume of that region is determined by convective heat transfer processes. To determine this volume, consider the temperature distribution downstream of a vertical line heat source. Since the thermal conductivity of soil is much smaller than that of water, heat conduction out of the aquifer in the vertical direction through the soil is small compared to conduction within the aquifer. (The situation and analysis would be different for rock formations which have thermal conductivities greater than that of water.) Thus, heat conduction occurs primarily in two dimensions within the aquifer; and, convective heat transfer dominates over conduction in the flow direction for typical water flows.

Figure 4:
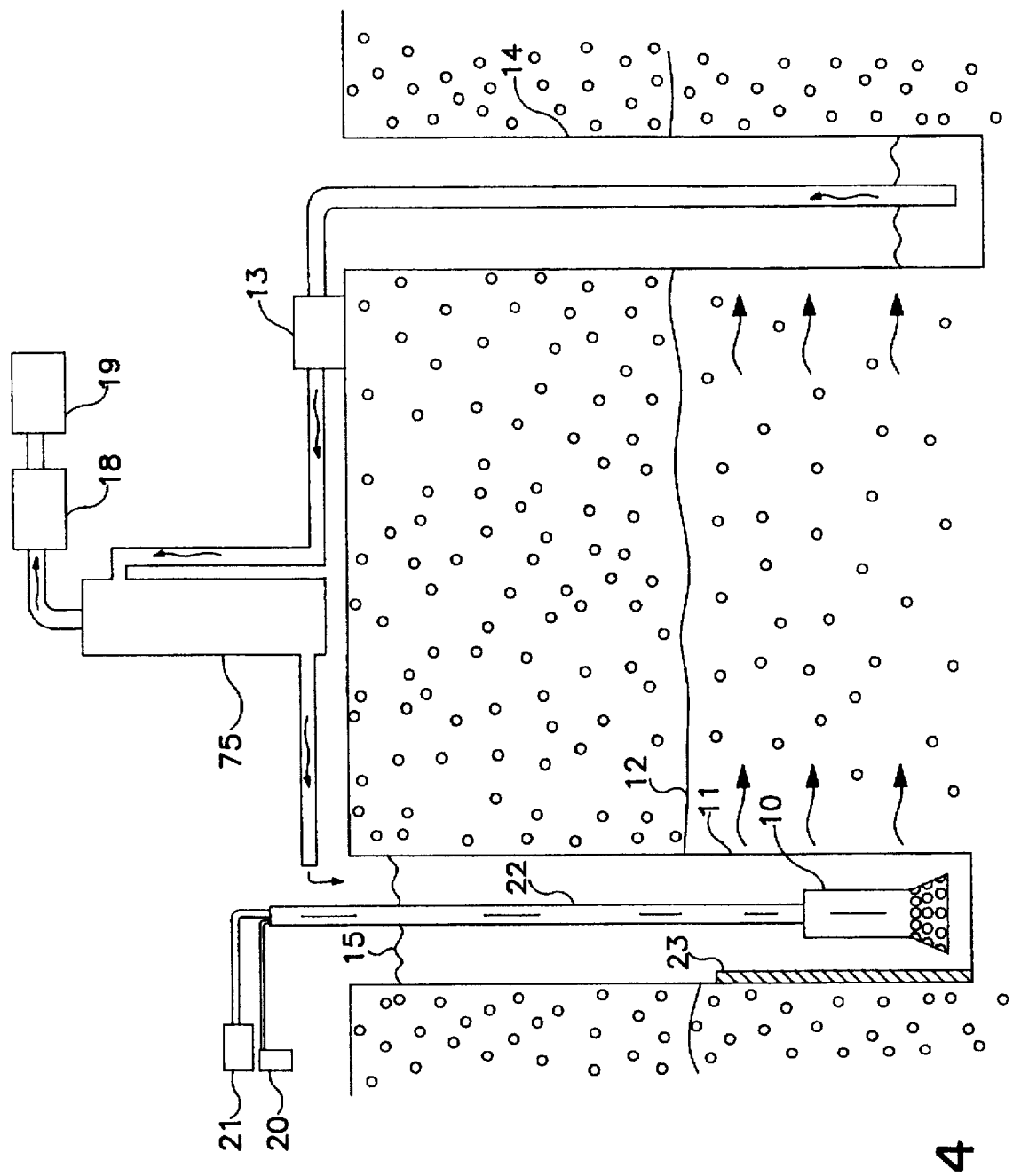
FIG. 4 is a schematic cross-sectional view of another embodiment of a submerged combustor using a separate vapor extraction unit such as an air or steam stripper to remove the contaminant vapors.

Referring now to FIG. 4, wells and a submerged burner assembly similar to those in FIG. 1 are illustrated, but with the method of contaminant extraction modified. In FIG. 4, pump 13 transports water to a vapor extraction unit 75, such as an air or steam stripper, with the contaminant vapors drawn by a fan or vacuum pump 18 to a vapor condenser, charcoal filter or other post treatment process 19. The decontaminated water is then returned to the ground via the burner well water column 15.

EXAMPLES OF THE INVENTION

Operation of the process and apparatus of the present invention is described in the following examples which are intended to be merely illustrative and the invention is not to be regarded as limited thereto.

Example 1

An aquifer with a depth of 30 ft. had been contaminated by TCE over an area of 1000 ft.$^2$ with surface dimensions of 20 ft. in the direction normal to the natural groundwater flow and 50 ft. in the flow direction. The TCE concentration of approximately 18,000 g. per cubic meter of soil was to be reduced to 1.5 g. per cubic meter (a level of 1 ppb). The soil had a basic composition of sand and gravel with a groundwater flow of $3\times10^{-4}$ cm/s, typical for such soils. The TCE reduction has been accomplished by installing an array of four immersion tube burner wells in a line normal to the direction of water flow. The centers of the two end wells were placed 2 ft. inside of the 20 ft. dimension and the centers of the remaining two wells 5'4" from these. All the wells had an inside diameter of 4" and were pressurized to at least 1" of water to obtain adequate transverse dispersal of the heated water. Having delivered a total of 50,000 BTU/h., divided evenly between all the wells, the minimum temperature in the region that was to be treated was maintained at a temperature of at least 60° C., which resulted in a remediation time of 1.5 years. If the total heating rate had been reduced to 40,000 BTU/h., the minimum temperature would have been 50° C. and the remediation time would have been 6 years.

Example 2

An aquifer with a depth of 30 ft. had been contaminated by TCE over an area of 4000 ft.$^2$ with surface dimensions of 20 ft. in the direction normal to the natural groundwater flow and 200 ft. in the flow direction. The TCE concentration of approximately 18,000 g. per cubic meter of soil was to be reduced to 1.5 g. per cubic meter (a level of 1 ppb). The soil had a basic composition of sand and gravel with a groundwater flow of $3\times10^{-4}$ cm/s, typical for such soils. The TCE reduction was to be accomplished by installing a horizontal well at the bottom of the aquifer normal to the groundwater flow direction to uniformly heat the full 20 ft. dimension without any explicit need for pressurization. Having delivered a total of 65,000 BTU/h., the minimum temperature in the region that was to be treated was 60° C. and the remediation time was 1.5 years. If the total heating rate had been reduced to 50,000 BTU/h., then the minimum temperature would have been 50° C. and the remediation time would have been 6 years. Here the use of a more sophisticated drilling technology and a 33% increase in the heating rate has resulted in a four-fold increase in the volume that can be remediated compared to Example 1.

Example 3

An aquifer with a depth of 30 ft. had been contaminated by TCE over an area of 4000 ft.$^2$ with surface dimensions of 20 ft. in the direction normal to the natural groundwater flow and 200 ft. in the flow direction. The TCE concentration of approximately 18,000 g. per cubic meter of soil was to be reduced to 1.5 g. per cubic meter (a level of 1 ppb). The soil had a basic composition of sand and gravel with a groundwater flow of $3\times10^{-4}$ cm/s, typical for such soils. The groundwater flow had been enhanced by placing a 90 gpm pumping well at the downstream end of the remediation zone and delivering the pumped water to an unheated well upstream of the array of four 4-inch diameter submerged combustion wells in a line normal to the direction of water flow and about 60 ft. downstream of the unheated upstream well. The centers of the two heated end wells of the array were placed 2 ft. inside of the 20 ft. dimension and the centers of the remaining two wells 5'4" from these. Having delivered a total of 50,000 BTU/h., the minimum temperature was 60° C. and the remediation time was 1.5 years. If the total heating rate had been reduced to 40,000 BTU/h., the minimum temperature would have been 50° C. and the remediation time would have been 6 years. The result of Example 2 (remediation of 4000 ft.$^2$) has been achieved with the same heating rate and well drilling technology as in Example 1 (remediation of 1000 ft.$^2$) by the addition of pumping to elongate the thermal plume.

Example 4

A circular area site with a diameter of 100 ft. had been contaminated by a gasoline spill in unsaturated sand at between 10 and 20 ft. below the soil surface. A well in the center of this site was fitted with an underground burner having an output of 50,000 BTU/h. and a combustion air flow rate of 50 cubic feet per minute (cfm). An additional 50 cfm was supplied coaxially around the burner. All of the combustion gases and additional air exited through openings in the well casing since the top of the well was sealed by a packer. Eight additional wells were positioned symmetrically at a radius of 70 ft. from the central well in a manner similar to that shown in FIG. 3. These additional wells were manifolded to a single blower with a capacity of 150 cfm to produce a partial vacuum on the wells so that the combustion gases and the gasoline vapor could be extracted from the subsurface soil. A vapor barrier was placed over the site out to 50 ft. beyond the collection wells (120 ft. from the central well) to minimize the infiltration of surface air. The barrier immediately over the contaminated area was thermally insulated by raising it a short distance above the ground to form a trapped air layer. The gasoline vapors were collected in a separate treatment facility downstream of the blower. The elevated temperatures (at least 95° C. at all points in the contaminated region) resulted in 90% of the gasoline being recovered within 3 months. Five years would be needed to recover the same amount of gasoline if there was no heating and the soil temperature was at 10° C.

While the present invention has been described in connection with an exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed is:

1. A method for removing a volatile organic contaminant from groundwater or subsurface soil surrounding a well, which comprises:

positioning a submerged combustion unit in water in said well;

introducing for burning, a combustible gaseous mixture into said submerged combustion unit; and heating water in said well to a temperature for a time sufficient to form an expanding thermal boundary thereby forcing said volatile organic contaminant from said well and surrounding subsurface soil.

2. The method for removing a volatile organic contaminant as defined in claim 1 and further including the steps of positioning a vapor barrier about a region surrounding said well collecting a gaseous stream from said vapor barrier including said volatile organic contaminant and removing said volatile organic contaminant from said gaseous stream.

3. The method for removal of volatile organic contaminants as defined in claim 1 wherein a casing is positioned and overlaid by a packer after positioning said submerged combustion unit and wherein a pressure relief valve is positioned with its inlet port below said packer.

4. The method for removal of volatile contaminants as defined in claim 3 wherein slots are provided in said casing.

5. The method for removal of volatile contaminants as defined in claim 1 and further including the steps of introducing water from an independent source into said well.

6. The method for removal of volatile contaminants as defined in claim 5 wherein flow rate of water from said independent source is from 0.3 to 30,000 gallons/min.

7. The method of removal of volatile contaminants as defined in claim 6 wherein said flow rate is from 3 to 300 gallons/min.

8. The method for removal of volatile contaminants as defined in claim 1 wherein said well is centrally disposed within an array of wells.

9. The method for removal of volatile contaminants as defined in claim 8 wherein water is withdrawn from said array of wells and is introduced into said well including said submerged combustion unit.

10. The method for removal of volatile contaminants as defined in claim 1 wherein flow rate of said combustible gaseous mixture is between 0.1 to 10,000 ft.$^3$/hr.

11. The method of removal of volatile contaminants as defined in claim 10 wherein said flow rate is from 3 to 3000 ft.$^3$/hr.

12. The method for removal of a volatile organic contaminant as defined in claim 1 and further including the step of heating additional air or gas for passage through said subsurface soil away from said well.

13. The method for removal of a volatile organic contaminant as defined in claim 1 wherein a packer is placed above a level of water in said well to permit the production of increased pressure to force said volatile organic contaminants through said aquifer.

14. The method for removal of a volatile organic contaminant as defined in claim 1 wherein heating produces steam for passage through said aquifer away from said well.

15. An assembly for removing a volatile organic contaminant from groundwater in an aquifer to be treated, which comprises:

a submerged combustion unit;

conduit means for positioning said submerged combustion unit below a water level in a well in said aquifer to be treated;

means for introducing a combustible gaseous mixture into said submerged combustion unit to vaporize said volatile organic contaminant;

means for collecting a gaseous mixture including said volatilized contaminant; and means for separating said contaminant from said gaseous mixture.

16. The assembly as defined in claim 15 and further including a pump and conduit means for passing water from an adjacent well to said well in said aquifer to be treated for removal of volatile contaminants.

17. The assembly as defined in claim 16 wherein said means for collecting said gaseous mixture is a vapor barrier peripherally-disposed on the ground surface about said well.

* * * * *